Figure 1:
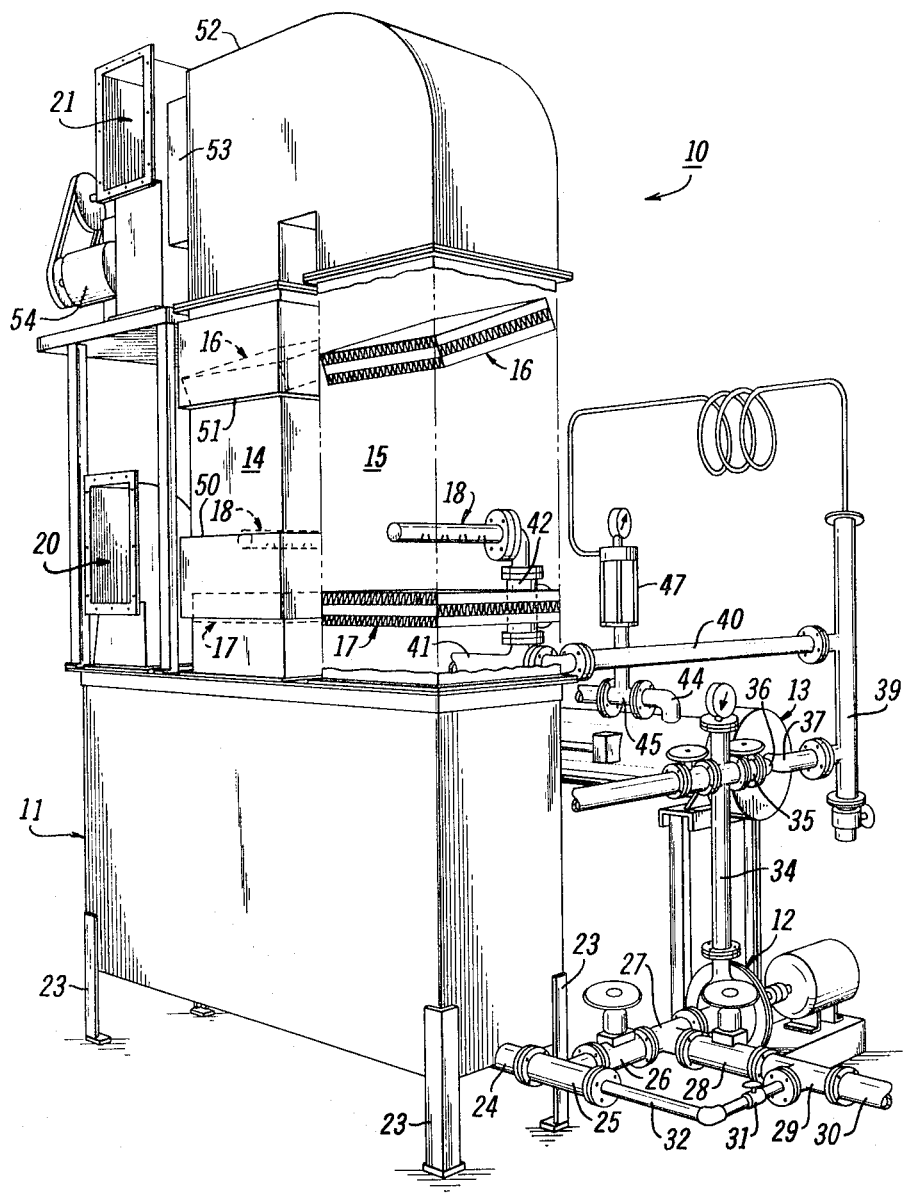
Figure 2:
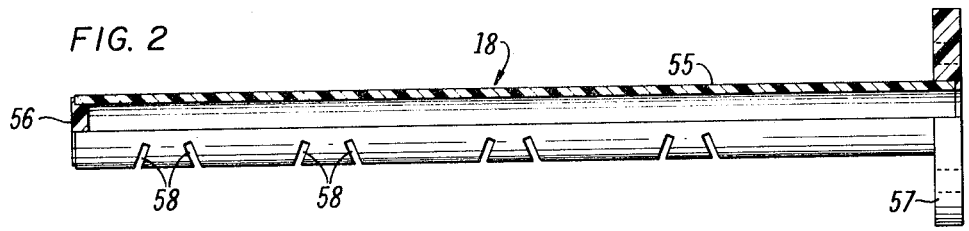
Figure 3:
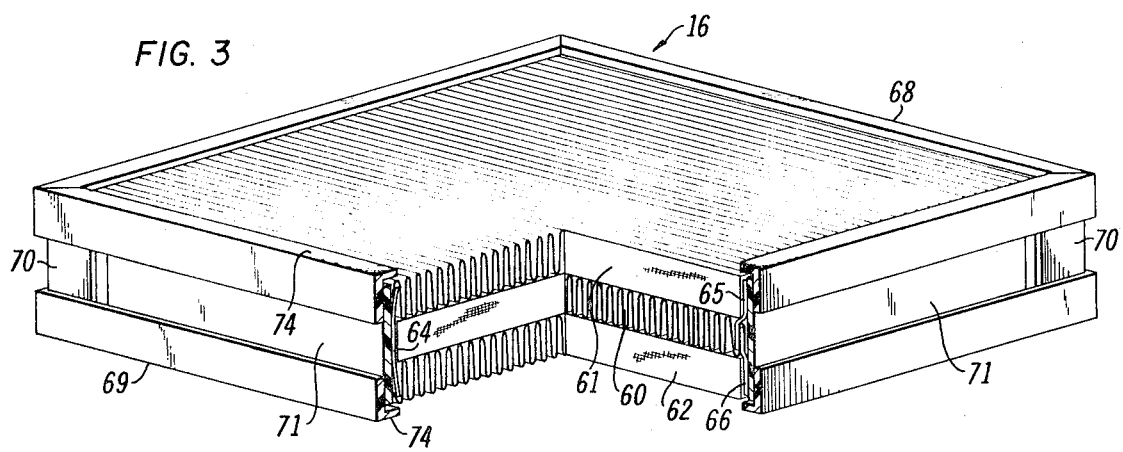
Figure 4:
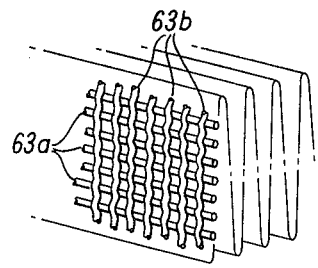

United States Patent [19]
Zievers et al.

[11] 3,760,566
[45] Sept. 25, 1973

[54] EVAPORATOR AND ENTRAINMENT SEPARATOR

[75] Inventors: James F. Zievers; Clay W. Riley, both of La Grange, Ill.

[73] Assignee: Industrial Filter & Pump Mfg. Co., Cicero, Ill.

[22] Filed: Mar. 24, 1971

[21] Appl. No.: 127,470

[52] U.S. Cl. ............... 55/223, 55/228, 55/233, 55/239, 55/259, 55/489, 55/510, 55/521, 55/527, 159/4 R, 202/86, 202/197, 261/98, 261/131, 261/149, 261/151
[51] Int. Cl. ............................................. B01d 47/02
[58] Field of Search .............. 55/233, 228, 250, 55/485, 489, 528, 499, 239, 223, 259, 510, 521, 527; 261/151, 141, 130, 131, 147, 149, 98; 202/197, 200, 86; 203/40; 159/4 R

[56] References Cited
UNITED STATES PATENTS
2,239,595  4/1941  Cummings, Jr. ............... 261/141 X
2,897,146  7/1959  Waddill ............................ 203/40 X FOREIGN PATENTS OR APPLICATIONS
807,517  1/1959  Great Britain .................... 55/223 X
447,215  3/1948  Canada ............................ 55/489 X Primary Examiner—Tim R. Miles
Assistant Examiner—William Cuchlinski, Jr.
Attorney—Fidler, Patnaude & Batz

[57] ABSTRACT

An evaporator and entrainment separator for evaporating water from a toxic solution and releasing water vapor to the atmosphere includes a tank for containing the toxic solution, one or more vertical stacks mounted over the tank and containing a plurality of moisture entrainment grids and a spray nozzle which directs heated solution from the tank down onto one of the entrainment grids. A blower draws air across the surface of the heated solution in the tank and up through the stacks.

7 Claims, 4 Drawing Figures

INVENTORS
JAMES F. ZIEVERS
CLAY W. RILEY
BY
ATTORNEYS

PATENTED SEP 25 1973  3,760,566

SHEET 2 OF 2

INVENTORS
JAMES F. ZIEVERS
CLAY W. RILEY
BY
ATTORNEYS

EVAPORATOR AND ENTRAINMENT SEPARATOR

The present invention relates to a method and apparatus for evaporating water from a toxic solution and releasing it to the atmosphere in the form of non-toxic water vapor.

The disposal of toxic solutions and the recovery of various constituents thereof, such, for example, as metal ions, is becoming of ever greater importance because or stricter pollution control laws and regulations and because of the increased value of the recoverable materials. Depending upon the economics of a particular situation, various different systems, both chemical and mechanical, are available for reducing the toxicity of the solutions and recovering parts thereof. Many such systems require evaporation of water from the solutions, and evaporators have been manufactured for this purpose. Inasmuch as the solution undergoing evaporation is frequently toxic or otherwise objectionable, it is important to prevent its release to the atmosphere. Apparatus has also been manufactured for preventing the emission of droplets of such solutions along with the water vapor. Such evaporators and separators have been expensive to manufacture and operate; have, for the most part, been custom designed and manufactured for each installation; and have not performed satisfactorily in many instances. Moreover, where a processing system has been enlarged, the evaporator and/or the separator had to be replaced with larger units.

Therefore, an object of the present invention is to provide a new and improved evaporator and entrainment separator.

Another object of the present invention is to provide a new and improved evaporator and entrainment separator which can be readily increased in operating capacity.

A further object of the present invention is to provide a new and improved method for evaporating water from an aqueous solution.

A still further object of the present invention is to provide a new and improved entrainment separator.

Briefly, the above and further objects may be realized in accordance with the present invention by providing a tank and one or more entrainment separator modules mounted thereon. Air is drawn across the surface of the solution in the tank and discharged through the separators to the atmosphere. The separator modules each includes a pair of entrainment grids spaced apart one above the other and a spray nozzle for directing a spray of the heated solution downwardly into the space between grids where it is vaporized by the up-flowing air. The grids are hydrophobic whereby moisture droplets entrained thereby fall by gravity into the tank and are heated and recirculated to the spray nozzles. The capacity of the system can be increased by simply increasing the size of the blower and the number of entrainment stacks.

Further objects and advantages and a better understanding of the invention may be had from the following detailed description taken in connection with the accompanying drawings, wherein:

FIG. 1 is a perspective view of an evaporator and entrainment separator embodying the present invention;

FIG. 2 is a partially sectioned view of a spray nozzle embodying another aspect of the present invention;

FIG. 3 is a perspective view of an entrainment grid unit embodying the present invention and partially broken away to show the internal construction thereof; and FIG. 4 is an enlarged, fragmentary view of a portion of the grid unit of FIG. 3.

Referring now to the drawings, and particularly to FIG. 1 thereof, there is shown an evaporator and entrainment separator generally indicated at 10 and comprising as its principal parts a tank 11; a pump 12; a heat exchanger 13; a plurality of entrainment separator modules 14 and 15 each containing a pair of entrainment grid units 16 and 17 and a distributor spray nozzle 18; an air inlet hood 20; and a blower, not shown, for blowing air from an outlet duct 21. Briefly considered, the solution to be evaporated is pumped by the pump 12 through the heat exchanger 13 wherein its temperature is elevated to about 140° F. and then to the distributor nozzles 18 which atomizes the solution and sprays it downwardly toward the entrainment grids 17. At this same time, the blower is drawing fresh air in through the inlet duct 20 from which it passes across the surface of the solution contained in the tank 11 and up through the entrainment stacks 14 and 15 and out through the outlet 21. Preferably, the inlet 20 and the outlet 21 are connected by suitable air ducts to the exterior of the building in which the unit 10 is located. It will thus be seen that the air, and liquid particles entrained thereby, pass upwardly through the entrainment stacks 14 and 15 while the vapor spray from the nozzles 18 is directed downwardly in the opposite direction.

As is explained in greater detail hereinafter, the entrainment grids 16 and 17 are preferably identical in construction and present a tortuous path to the air and vapor passing therethrough. The grids are formed of a hydrophobic material so that any moisture droplets which condense thereon fall by gravity back into the tank 11. It will be noted that the upper entrainment grid 17 is mounted at an angle of approximately 20° so that the liquid captured thereby flows to one edge of the grid unit where it collects into relatively large drops which fall along one side of the stack onto the lower grid and then through the lower grid into the tank. When the level of liquid in the tank has reached an optimum level of approximately 6 inches below the top of the tank, the outlet from the tank is connected by suitable valving to the inlet of the pump 12 whereby the liquid solution in the tank 11 is continuously recirculated through the heat exchanger and the distributor nozzles 18. An amount of liquid equal to the amount being evaporated by the unit 10 may then be continuously fed to the pump 12 in addition to the solution being recirculated from the tank 11 thereby maintaining a constant level of liquid in the tank 11.

Considering the unit 10 in greater detail, the tank 11 is rectangular in cross section and supported on a plurality of legs 23. A pipe 24 connects to the bottom of the tank 11 at the forward end thereof as shown in fIG. 1 and to a T-connector 25 having one leg thereof connected through a manual valve 26 to a T-connector 27 which is in turn connected to the inlet of the pump 12. The other leg of the T-connector 27 is connected through a valve 28 to a T-connector 29 having one leg thereof connected to an inlet line 30. The other leg of the T-connector 29 is connected through a valve 31 and a relatively small line 32 to the other leg of the T-connector 25. The line 32 including the valve 31 thus provides a bypass to the tank 11 around the valves 26 and 28. This line is used to supply liquid to the tank 11 under normal operating conditions to replace the evaporated liquid and maintain the liquid level in the tank 11 constant.

The outlet of the pump 12 is connected to a line 34 which is in turn connected through a valve 35 to an inlet 36 to the heat exchanger 13. The outlet 37 from the heat exchanger 13 is connected through a vertical line 39, a line 40 and a horizontal manifold 41 extending along the back of the unit 10 directly behind the lower ends of the stack modules 14 and 15. The manifold 41 is connected through suitable valves 42 to each of the distributor spray nozzles 18. The heat exchanger 13 is conventional in that the liquid inlet and outlet lines 36 and 37 connect to opposite ends of a spiral tube extending the length of the heat exchanger. The heating medium such, for example, as steam, is supplied to an inlet 44 through a control valve 45 which is responsive to the temperature of the liquid in a control device 47 connected to the line 39 so as to admit a sufficient amount of steam to the heat exchanger 13 to maintain the temperature of the liquid being sprayed from the nozzles 18 at the desired value. The steam outlet from the heat exchanger 13 is not shown but is conventional and includes a steam trap to prevent live steam from being exhausted into the atmosphere in the vicinity of the unit 10.

The entrainment separator stacks 14 and 15 are identical and are manufactured as modular units so as to be usable with different sizes of evaporators. For example, in a smaller unit than that shown in FIG. 1, the tank would be substantially shorter and only a single stack would be used. On the other hand, where a relatively small capacity unit is needed at first but it is anticipated that a larger evaporator will be required in the future then a tank such as tank 11 is employed using only the stack 14, in which case a cover plate is placed over the portion of the tank 11 shown occupied by the stack 15 in FIG. 1. Then, at a later date, the additional stack can be added.

As shown in FIG. 1, the entrainment separator stack modules are each provided with a pair of rectangular enlargements 50 and 51 in which the entrainment grids 16 and 17 are located. As is explained in greater detail hereinafter in connection with FIGS. 3 and 4, the entrainment grid units 16 and 17 have a peripheral imperforate portion. The enlargements provide spaces for receiving these peripheral portions so that the full area of the stacks are employed and are not decreased by the entrainment grid units 16 and 17. The forward faces of the enlargements 50 and 51 are removable panels so as to permit access to the entrainment grids and also to the distributor spray nozzles 18.

Mounted above the stack modules 14 and 15 is a hood 52 which couples the effluent from the entrainment modules 14 and 15 to the blower located within the housing 53 located between the hood 52 and the exhaust port 21. An electric motor 54 is drivingly connected to the blower and is energized whenever the system is in operation. An advantage achieved by placing the blower near the exhaust end of the unit 10 is that any leaks in the system do not permit the release of noxious gases or vapor to the area surrounding the unit 10.

Referring now to FIG. 2, there is shown a distributor spray nozzle 18. The nozzle 18 as shown in FIG. 1 extends substantially across the width of the stack modules in which it is mounted and comprises a rigid tube 55 provided with a plug 56 at the distal end and an apertured mounting flange 57 at the other end. The tube 55 is provided with a plurality of pairs of slots 58 which may conveniently be cut into the tube 55 by a saw blade. These cuts, which diverge toward the axis of the tube are angled at about 70 degrees relative to the axis of the tube and the cuts in each pair are spaced apart by about 1½ inches and the pairs are spaced about 2½ inches apart. The nozzle 18, is therefore, easily and inexpensively constructed and provides a very effective liquid spray throughout substantially the entire cross-sectional area of the lower entrainment grid 17.

Referring to FIG. 3, there is shown one of the entrainment grid units 16. It includes a pleated grid member 60 sandwiched between a pair of similar pleated grid members 61 and 62 with the pleats of the grid members 61 and 62 extending perpendicular to the pleats of the grid member 60. The grid members 60–62 are formed of a perforate material which, as best shown in FIG. 5, comprises a plurality of parallel filaments **63*a* and a plurality of cross filaments 63*b* bonded together at their points of intersection but not woven together. The filaments 63*a* and 63*b* are formed of polyethylene or some other hydrophobic shape retaining material which is sufficiently flexible when heated so as to be formable into the tight pleats required in the entrainment grid units 16 and 17. In a successful reduction to practice of the present invention, approximately five pleats per inch were employed with the thickness of each of the pleated units 60–62** being 1⅛ inches. Accordingly, the entrainment grids were approximately 3⅜ inches thick.

Each entrainment grid unit 16 and 17 thus includes three of the pleated grid units 60–62 sandwiched together as shown in FIG. 3. Each of the open edges of the pleats in the center grid 60 is closed off by an imperforate strip 62 which overlies the open edges of these pleats and extends into the end pleats of the upper and lower grids 61 and 62. The open edges of the pleats in the grids 61 and 62 are closed off by imperforate strips 65 and 66. The strip 66 overlies the open end of the pleats in the grid 62 and extends into the end pleat of the center grid 60. The strip 65 overlies the open end of the pleats in the grid 61 and extends into the next to last pleat in the center grid 60.

The stack of grids 60–62 are supported in a square frame which includes a pair of top and bottom frame members 68 and 69, four imperforate, right-angle corner members 70, and four imperforate side wall members 71. The corner members 70 and the wall members 71 are cemented to the frame members 68 and 69 to form an integral unit. Flanges 74 on the frame members 68 and 69 hold the grid stack 60–62 within the frame.

The system as shown in FIG. 1 utilizes a heat exchanger located outside of the tank 11. If desired, the heat exchanger may be located inside of the tank 11, but it is preferred that the solution be passed through the heat exchanger immediately prior to being supplied to the distributor spray nozzles 18 so that the temperature of the sprayed solution is higher than the average temperature of the solution in the tank 11. At the higher temperature and being in the form of a fine spray, it more readily evaporates within the stacks 14 and 15 and provides a more efficiently operating system.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:

1. An evaporator and entrainment separator for vaporizing a solution, comprising
   an elongated tank for containing said solution,
   said tank having a rectangular open top,
   heat exchanger means mounted adjacent said tank and connected thereto for heating said solution,
   a plurality of entrainment separator assemblies mounted in side-by-side relationship on said tank over said open top,
   each of said separator assemblies including a vertical duct having a plurality of entrainment grid units mounted therein one above the other in spaced apart relationship and an atomizer mounted between said grid units for spraying the heated solution toward the lower one of said grid units, and
   a blower mounted on and above said tank in line with said ducts and connected to the tops of said ducts for drawing air into said tank through the portion of said open top below said blower, across the surface of the solution in said tank and upwardly through said entrainment separator assemblies.

2. An evaporator and entrainment separator according to claim 1 wherein
   said grid units are formed of a hydrophobic plastic material.

3. An evaporator and entrainment separator according to claim 2 wherein
   said grid units are identical.

4. An evaporator and entrainment separator according to claim 2 wherein each of said grid units comprises
   a plurality of pleated, perforate, plastic members lying in face-to-face relationship with the pleats in adjacent members extending in mutually orthogonal directions.

5. An evaporator and entrainment separator according to claim 1 wherein
   said heat exchanger is mounted externally of said tank, and further comprising
   means circulating the solution from said tank, through said heat exchanger and to said atomizer.

6. An evaporator and entrainment separator comprising
   a tank for containing said solution,
   a heat exchanger for heating said solution,
   an entrainment separator assembly mounted over an opening in the upper portion of said tank,
   said separator assembly including a duct and a plurality of vertically spaced apart entrainment grid units mounted in said duct,
   means for forcing air across the surface of the solution in said tank and upwardly through said separator assembly, and
   an atomizer mounted between said grid units for spraying the heated solution toward the lower one of said grid units,
   said grid units each comprising
   a plurality of pleated, perforate, hydrophobic plastic members lying in face-to-face relationship with the pleats in adjacent members extending in mutually orthogonal directions, and
   strip means overlying and blocking the open edges of the pleats in said plastic members.

7. An entrainment separator grid comprising
   a plurality of pleated, perforate, hydrophobic plastic members lying in face-to-face relationship with the pleats in adjacent members extending in mutually orthogonal directions,
   a plurality of imperforate strips overlying the open edges of the pleats in said plastic members,
   said strips extending into the pleats of the adjacent plastic members, and
   a unitary frame encircling said plastic members and said strips and holding said grid in assembled relationship.

* * * * *